(12) United States Patent
Sarwary et al.

(10) Patent No.: US 8,607,173 B2
(45) Date of Patent: Dec. 10, 2013

(54) HIERARCHICAL BOTTOM-UP CLOCK DOMAIN CROSSING VERIFICATION

(75) Inventors: Mohamed Shaker Sarwary, San Diego, CA (US); Maher Mneimneh, San Jose, CA (US); Paras Mal Jain, Greater Noida (IN); Deepak Ahuja, Delhi (IN); Mohammad Homayoun Movahed-Ezazi, Saratoga, CA (US)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/416,856

(22) Filed: Mar. 9, 2012

(65) Prior Publication Data

US 2013/0239080 A1 Sep. 12, 2013

(51) Int. Cl.
*G06F 17/50* (2006.01)

(52) U.S. Cl.
USPC .......................................... 716/106

(58) Field of Classification Search
USPC .......................................... 716/106
See application file for complete search history.

(56) References Cited

U.S. PATENT DOCUMENTS

| | | | |
|---|---|---|---|
| 7,073,146 B2 | 7/2006 | Sarwary et al. |
| 7,162,706 B2 | 1/2007 | Kuang et al. |
| 7,216,318 B1 | 5/2007 | Siarkowski |
| 7,289,946 B1 | 10/2007 | Lee |
| 7,356,789 B2 | 4/2008 | Ly et al. |
| 7,382,824 B1 | 6/2008 | Marmash et al. |
| 7,454,728 B2 | 11/2008 | Ly et al. |
| 7,502,969 B2 | 3/2009 | Beard et al. |
| 7,506,292 B2 | 3/2009 | Sarwary et al. |
| 7,587,690 B1 | 9/2009 | Siarkowski et al. |
| 7,650,581 B2 | 1/2010 | Rahim et al. |
| 7,665,059 B2 | 2/2010 | Czeck et al. |
| 7,712,062 B2 | 5/2010 | Ly et al. |
| 7,779,286 B1 | 8/2010 | Pritchard et al. |
| 7,840,924 B2 | 11/2010 | Kowatari |
| 7,888,971 B2 | 2/2011 | Iwashita |
| 2008/0134107 A1* | 6/2008 | Wang et al. ................... 716/2 |
| 2008/0198957 A1 | 8/2008 | Kowatari |
| 2009/0217075 A1 | 8/2009 | Adar et al. |
| 2010/0146468 A1 | 6/2010 | Czeck et al. |
| 2010/0199244 A1 | 8/2010 | Kwok et al. |
| 2010/0242003 A1 | 9/2010 | Kwok |
| 2011/0161903 A1 | 6/2011 | Iwashita |

OTHER PUBLICATIONS

Atrenta, Inc., SpyGlass (r) CDC Industry's Most Comprehensive, Practical, and Powerful CDC Solution, Atrenta The SoC Realization Company, moreinfo@atrenta.com; www.atrenta.com, Phone:408-453-3333, date 2011; pp. 2.

* cited by examiner

*Primary Examiner* — Vuthe Siek
(74) *Attorney, Agent, or Firm* — Sughrue Mion, PLLC

(57) ABSTRACT

Clock-domain crossing (CDC) verification for system on chip (SoC) integrated circuits (IC) can be time consuming and complex, especially as the size of the SoC and the complexity of the modules of which it comprises increase. A bottom-up verification process includes the replacement of a CDC verified module by an abstracted model of the module with constraints defined on the boundaries of the module. Performing the process in a hierarchic manner from bottom upwards allows for faster verification of modules higher in the hierarchy as at least portions thereof are replaced with the abstracted modules.

12 Claims, 3 Drawing Sheets

HIERARCHICAL BOTTOM-UP CLOCK DOMAIN CROSSING VERIFICATION

BACKGROUND OF THE INVENTION

1. Field of the Invention

The invention generally relates to the design verification of integrated circuits (ICs) and more specifically to a verification flow that optimizes the verification of large ICs by using a hierarchical approach to clock-domain crossing (CDC) verification.

2. Description of the Related Art

Today's integrated circuits (ICs) are getting ever larger with millions upon millions of transistors integrated in a single IC that is in fact a system on chip (SoC). As part of the verification of a design it is necessary to verify that signals crossing clock domains operate properly. Often a single clock-domain crossing (CDC) verification run of a large IC takes several days. This makes it very hard to perform multiple runs needed to successfully close CDC verification, and to integrate the runs into a regression flow.

Prior art, such as SpyGlass® CDC, a product of Assignee, provides an IP Block constraint approach for hierarchical CDC verification of large designs. This constraint hides the details of the block on which it is applied except for its input/output interface. A similar approach is provided by Kwok in US patent application 20100242003 where partitioning into blocks is suggested, where a block level clock-domain crossing verification process is performed on selected blocks. Verification interface files are then generated by the block level clock domain crossing process. Then, a top level clock domain crossing verification process is performed over the entire design. While this approach is effective for verifying the correctness of the domains on the interface between the block and the SoC, it does not address various other requirements for complete CDC verification. One requirement is that a constant value on the output of a block must have a corresponding constant value on the corresponding input at the SoC level. Another requirement is that a control synchronizer in one block does not converge with a control synchronizer from another block at a gate outside these blocks. In summary, previous solutions lacked a holistic abstraction scheme that addresses all the needs of complete CDC verification. As a result, design teams avoid the use of these flows and resort to verification at the SoC level without using a hierarchical flow. This made the CDC verification of even smaller-sized SoCs a challenge, especially when multiple iterations are necessary to fix identified problems.

As the prior art suffers from deficiencies that make it incomplete with respect to a hierarchical verification of CDC, there is a need in the art to resolve such deficiencies. In particular it would be advantageous to provide a solution for hierarchical CDC verification that would practically allow repeated verification cycles without the high burden associated with repeated runs at the SoC level and incomplete results with IP Block constraints.

SUMMARY

According to an exemplary implementation, a method for clock-domain crossing (CDC) verification of an integrated circuit (IC) comprising a plurality of modules is provided. The method includes identifying a module from among the plurality of modules that has not been previously abstracted or that has not changed since a previous abstraction, the module having an input and an output. The method further includes performing a CDC verification on the module in a bottom-up fashion and replacing the module with a corresponding abstraction module that correctly identifies a corresponding clock-domain for each of the input and the output, the replacing performed in response to the module successfully passing the respective CDC verification. The method further includes repeating the identifying, performing, and replacing for each of the remaining modules from among the plurality of modules; and storing an updated model of the IC in storage.

A computer program product is provided containing a plurality of instructions embedded in a non-transitory computer readable medium that when executed by a computing device causes the computing device to execute a method for clock-domain crossing (CDC) verification of an integrated circuit (IC) comprising a plurality of modules. The method includes identifying a module from among the plurality of modules that has not been previously abstracted or that has not changed since a previous abstraction, the module having an input and an output. The method further includes performing a CDC verification on the module in a bottom-up fashion and replacing the module with a corresponding abstraction module that correctly identifies a corresponding clock-domain for each of the input and the output, the replacing performed in response to the module successfully passing the respective CDC verification. The method further includes repeating the identifying, performing, and replacing for each of the remaining modules from among the plurality of modules; and storing an updated model of the IC in storage.

A system comprising a processing unit and a memory communicably coupled to the processing unit is provided. The memory stores a design file for an integrated circuit and instructions for enabling the processing unit to perform a clock-domain crossing (CDC) verification of the integrated circuit (IC) comprising a plurality of modules.

DETAILED DESCRIPTION OF EXEMPLARY IMPLEMENTATIONS

Clock-domain crossing (CDC) verification for system on chip (SoC) integrated circuits (IC) can be time consuming and complex, especially as the size of the SoC and the complexity of the modules therein increases. A bottom-up verification process includes the replacement of a CDC verified module by an abstracted model of the module with constraints defined on the boundaries of the module. Performing the process in a hierarchical manner from bottom upwards allows for faster verification of modules higher in the hierarchy as at least portions thereof are replaced with the abstracted modules.

According to an exemplary implementation, a methodology for hierarchical clock-domain crossing (CDC) verification of large system on chip (SoC) is comprised of independent CDC runs of a plurality of lower level blocks, also referred to as IP Blocks. Basically, the solution suggests that for each block of the SoC, a block-level CDC verification is run independently. During this step, an abstracted model of the block that annotates its relevant CDC information is generated. As lower level blocks have been abstracted for CDC purposes, a higher level block that may comprise one of more abstracted CDC blocks is also verified and CDC abstracted. This process continues until the upper level block is CDC verified. The run time of each block is relatively short and if no changes are made to the block then it remains CDC verified and CDC abstracted, as further discussed herein below. The exemplary implementation addresses the tradeoff between a fine-grain abstraction that guarantees completeness of CDC verification at the cost of huge runtime, and a coarse abstraction that guarantees a short runtime at the cost of completeness of CDC verification. This balance is achieved by ensuring that the abstracted models include all block details needed for structural analysis but without addressing functional verification across module boundaries. It should be noted that running any functional verification using abstracted models, discussed herein, might cause false positive or negative results.

There are mainly two types of information that are needed at each block boundary in order to perform chip level CDC verification. Firstly, the synchronizers in the transitive fanin of an output port of the block need to be identified. The synchronizers participate in two computations: data synchronization and convergence. Hereinafter, reference to a set of synchronizers reaching a port 'p' of module 'M' shall be Sync(p). Secondly, the domain of the flip-flops (FF) and/or latches that immediately drive the output ports of the abstracted block need to be identified. The set of FFs and/or latches driving a port p of module M shall be referred to as Domain(p).

Figure 1:
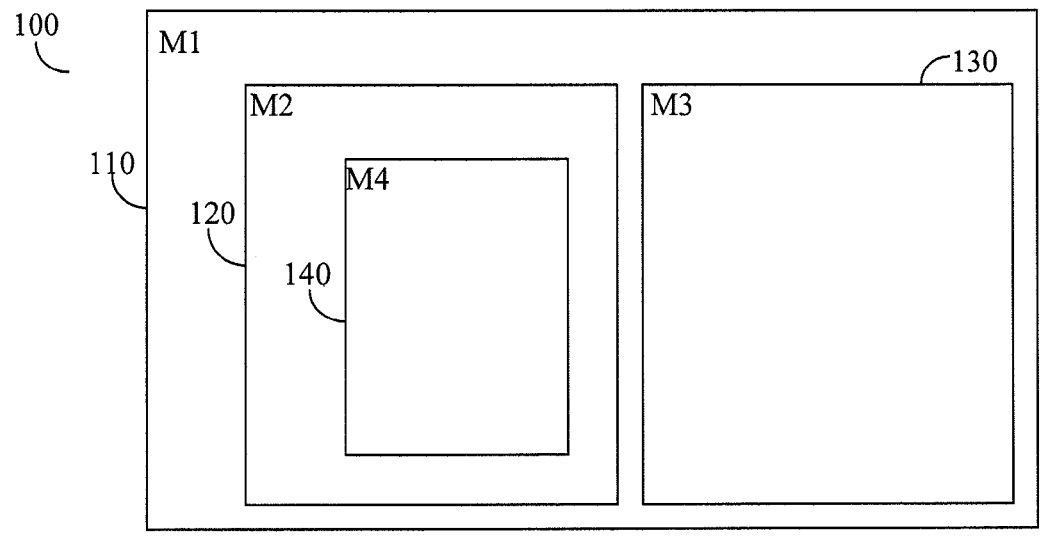
FIG. 1 is a schematic block diagram of an integrated circuit (IC) having a plurality of modules arranged in a hierarchy.

Reference is now made to FIG. 1 that depicts an exemplary and non-limiting schematic block diagram 100 of an IC 110 having a plurality of modules therein. The Module M1 is the highest block in the hierarchy of the IC 110 and hence is equivalent to the IC 110. At a lower lever from Module M1 110 there are the Modules M2 120 and M3 130. A Module M4 140 is a block within the Module M2 120 and hence it is lower in the hierarchy. Therefore, according to the principles of the invention, the Module M4 140 will be the first one to be CDC verified as a stand-alone module, then abstracted as further explained herein below, and replaced by the abstracted module. This way when, for example, CDC verification is needed on Module M2 120, and as long as Module M4 140 has not changed, the CDC verification of Module M2 120 will use the abstracted model of Module M4 140 thereby significantly reducing the verification runtime of Module M2 120.

To further illustrate these principles, assume that CDC verification of the chip represented by module M1 110 is desirable. First CDC verification of the two blocks M2 120 and M3 130 is performed. Subsequently the blocks M2 120 and M3 130 are abstracted according to the principles of the invention prior to verification of block M1 110. Notice, that if desired, block M4 140 would be CDC verified and then abstracted if not previously done. To correctly perform CDC verification of M2 120, it is necessary to specify Sync(p) and Domain(p) for each of M2's input ports. CDC verification assumes that these constraints are correct and propagates them forward to find synchronized crossings and convergences. In addition to correctly identifying synchronized and unsynchronized crossings inside block M2 120, this analysis also computes the sets Sync(p) and Domain(p) for each of M2's output ports. These Sync(p) and Domain(p) sets represent part of the abstracted or black-boxed model for M2 120. The same analysis is applied to block M3 130. Now blocks M2 120 and M3 130 are black-boxed and each output port p of M2 120 and M3 130 is represented by Sync(p) and Domain (p) of respective modules. After performing CDC analysis on block M1 110, the sets Sync(p) and Domain(p) for each input port p of M2 120 and M3 130 are also available. This can be used during chip level verification to verify that the sets already assumed for p during the block verification of M2 120 and M3 130 were correct in the context of the chip. If the sets were identical, then all the assumptions have been verified and the results are guaranteed to be correct.

Figure 2:
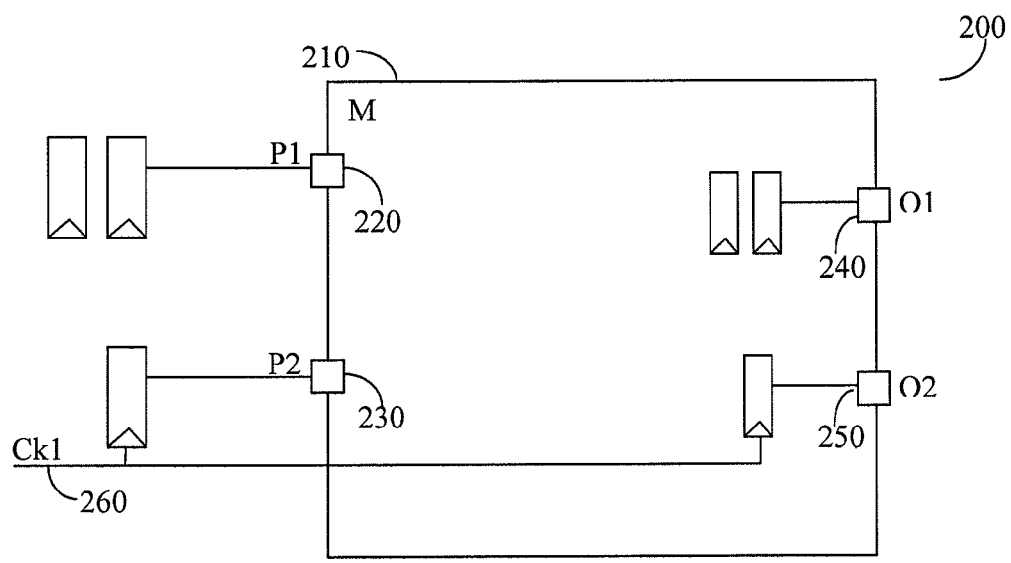
FIG. 2 is a module of an IC having input and output ports.

Reference is now made to FIG. 2 depicting an exemplary and non-limiting module M 210 of an IC 200 (only a portion of which is shown) having input ports P1 220 and P2 230 and output ports O1 240 and O2 250. According to the principles of the invention, the module M 210 assumes that input port P1 220 is driven by a synchronizer and that input port P2 230 is in the domain of clock Ck1 260. When IC 210 is instantiated from the higher level block, for example IC 200, these assumptions are verified during the analysis of IC 200. After CDC verification of M 210, we will have the following information at the output ports: output port O1 240 is driven by a synchronizer and that output port O2 250 is in clock domain Ck1 260. From the higher level, for example IC 200, it is assumed for the IC level CDC verification that output port O1 240 is synchronized and that output port O2 250 is in clock domain Ck1 260.

Referring to SyncAssume(p): Module input assumptions for synchronization, SyncAssert(p): Module output synchronization obtained by module CDC analysis, DomainAssume (p): Module input domain assumptions, and DomainAssert (p): Module output domain computed by block level CDC analysis allows to further explain the verification operation according to the principles of the invention. Two levels of analysis shall be performed: a) CDC verification of the lower module level based on SyncAssume(p) and DomainAssume (p), and b) CDC verification of the upper module level based on SyncAssert(p) and DomainAssert(p). Block level assumptions verification compares chip domain/sync analysis of the chip against DomainAssume(p)/SyncAssume(p) and reports any resulting violations where the sets are not equal.

It is important to note that the abstract model, automatically generated by the software, is editable, and a user can modify block boundary assumptions for use in subsequent steps. Furthermore, the user can create such abstraction of the block manually, if so needed. This use model is particularly beneficial when a block's register transfer level (RTL) code is not yet developed. In this use model the SoC designer can create the abstract model manually and use it for top level verification.

In one embodiment of the invention it is necessary to address the fact that the user may not always have complete assumptions at the input of the block. In such a case an additional feature allows the chip designer to propagate synchronization information from one side of an abstracted model to the other side, by allowing the user to enter input to output connectivity information. Synchronization information can be then propagated through the block. The minimum requirement is for the block owner to capture correct domain and synchronization information on its inputs for its block analysis.

As noted above according to the principles of the invention an abstraction of the model is computed by the system during CDC verification. This is done by generating an abstract port constraint in the following format:

abstract_port

-module m -port p
-clock c -comb [0|1|x]
[-sync -to t -from f -delay i -seq [0|1] [-active] [-inactive] -ame n1, n2, . . . , ni]
[-inputs p1, p2, . . . , pn]

Hence for a given module all of its ports are abstracted using the above description which is further explained herein below. It should be noted that not all fields need to be set up for a given port. The -module field has a string 'm' that is the name of the module being abstracted. The -port filed has a string 'p' which is a name of the port of the module being abstracted. The -clock field has a string 'c' which designates a clock port of the module or virtual clock which is internally generated. The -comb field indicates the existence of combinational logic on the path to the port. A comb value of '0' indicates that there is no combinational logic on the path from the synchronizer, FF, and/or latch to the port. A comb value of '1' indicates that there is combinational logic on the path to the port. A value of 'X' indicates that it does not matter if there is or there is not combinational logic on the path to the port. This field is important for analyzing the correctness of a control CDC crossing.

The existence of the field -sync is optional and indicates that there is a synchronizer in the fanin of the abstracted port. Under the field -sync there maybe additional fields as described hereinafter. The -to field has a string T which is the name of a clock (port or virtual) that is the destination of the synchronizer. The -from field has a string 'f' which is the name of a clock (port or virtual) that is the source of the synchronizer. The field -delay has an integer 'i' that indicates the number of 'domain' clock cycles by which input of synchronizer is delayed for metastability to settle. The filed -seq receives the values '0' or '1' where seq=0 indicates that the synchronizer directly drives the port with no latches or flops on the path, and where seq=1 indicates that there are sequential elements on the path from the synchronizer to the port. Also, one of -active or -inactive fields may be used where -active indicates that the synchronizer is active and can synchronize a crossing, and -inactive indicates that the synchronizer is inactive. An inactive synchronizer cannot synchronize a crossing and will be used for convergence checks only. It should be noted that typically -active is used as a default value. The -name field specifies the names of a plurality of synchronizers that drive the port. This field is used during convergence verification.

In addition to the -sync field there is an optional -inputs field that may receive a plurality of strings as a list of ports used to propagate the synchronizers that reach an input port to the correct output port to perform convergence analysis. It should be noted that only one of -sync and -inputs may be used. This is because the -inputs field specifies that an input port I1 has no synchronizers on all paths to the abstracted port. If there are synchronizers on the paths, then any other one in fanin of I1 is irrelevant.

The module abstraction according to the principles of the invention has several characteristics that should be understood to fully appreciate the innovation. Multiple constraints on a same port: it is possible that a port is connected to multiple flops or ports within the module and might have multiple synchronizers in its fanin. In this case, multiple constraints can be specified for a port. The constraints applied to the ports model what is driving that particular port. The name field is important to correctly handle convergence checks. This is needed when the same synchronizer inside a higher level module is feeding the ports of two different blocks. In such case, any convergence of the two ports should not be considered as a convergence violation since it has the same synchronizer as its source. It should be further noted that in general a block can be modeled to work in multiple contexts. For example, the abstract model does not need to know the actual domain of an input which may vary depending on the instantiation of the block. The analysis during CDC verification automatically analyzes the different domains and performs clock and domain mappings and reports violations in case of mismatches.

Figure 3:
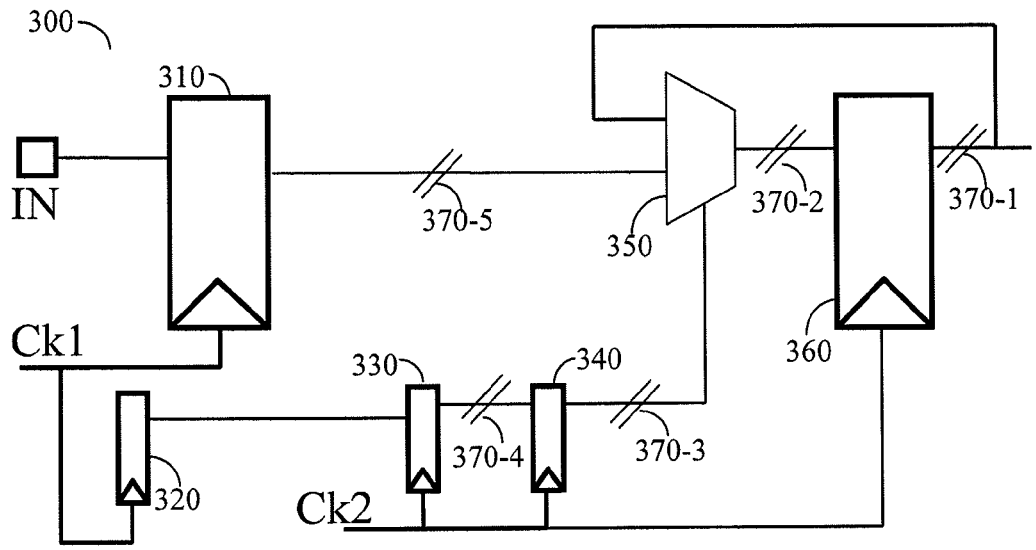
FIG. 3 is a circuit for illustrating the abstraction according to an exemplary implementation.

Reference is now made to FIG. 3 which describes an exemplary and non-limiting circuit 300 for illustrating the abstraction principles described above. The circuit comprises FFs 310 and 320 clocked by Ck1; FFs 330, 340 and 360 clocked by Ck2; and, multiplexer 350. Various output ports may be defined for the purpose of an abstract port depending on the desired block boundaries. For the purpose of illustration the boundaries 370-1 through 370-5 are discussed in the examples below, while it is assumed that Ck1 and Ck2 are input ports of a module M being abstracted. For simplicity of representations some of the fields discussed above, such as -name, -comb, and -seq, are intentionally omitted merely for simplicity.

For the module boundary 370-1, the following abstraction of the port may be produced:

abstract_port -module M -port P -sync -clock Ck2 from Ck1 -to Ck2 -inactive which indicates that the port P 370-1 is driven by a synchronizer in domain Ck2 and the source of the synchronizer is driven by domain Ck1.

In another example the module boundary is set between the output of the multiplexer 350 and the data input to the FF 360. For this module boundary 370-2 the following abstraction takes place:

abstract_port -module M -port P -clock Ck1
abstract_port -module M -port P -sync -clock Ck2 from Ck1 -to Ck2 where the first constraint indicates the presence of the FF 310 in domain Ck1 driving the port 370-2, and the second constraint indicates the presence of a synchronizer from Ck1 to Ck2 (FFs 320, 330 and 340) which can synchronize crossings since it is active. In this case that synchronizer is used for both convergence checks and synchronization checks. Since no name is specified for this synchronizer an internal name will be assumed.

In yet another example a module boundary 370-3 is set at the output of a double FF synchronizer (FFs 330 and 340). The abstraction model is as follows:

abstract_port -module M -port P -clock Ck2 -sync from Ck1 -to Ck2 and in yet another example a module boundary 370-4 is set to split the double flop synchronizer. The abstraction model is as follows:

abstract_port -module M -port P -clock Ck2 which is an example where the detection will be incorrect. Hence it is necessary to assume that a double-FF synchronizer is an atomic unit within a module and a boundary such as 370-4 should not occur.

Lastly, again in reference to FIG. 3, a module boundary 370-5 is set at the output of FF 310. The abstraction model for the port at 370-5 shall be as follows:

abstract_port -module M -port P -clock Ck1 where one of ordinary skill in the art would appreciate that this constraint helps in identifying global convergences where the source of the convergence may lay outside the block but it crosses through the block.

Figure 4:
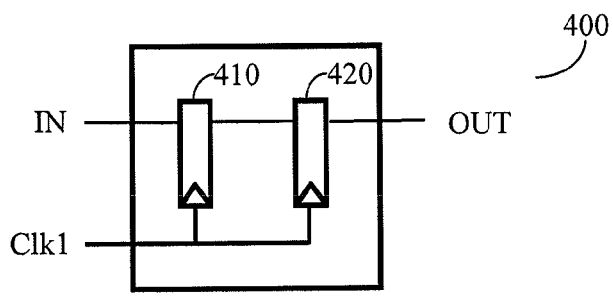
FIG. 4 is a block diagram of a module of a synchronization cell to be abstracted according to an exemplary implementation.

FIG. 4 is an exemplary and non-limiting block diagram 400 of a module of a synchronization cell to be abstracted according to the abstraction principles described earlier. The synchronization cell 400 comprises a FF 410 having an input, an output and a clock that is connected to Clk1. The input of FF 410 is connected to the IN signal. The output of FF 410 is connected to the input of FF 420 the output of which is connected to the OUT signal. The clock of FF 420 is connected to Clk1. The abstraction model is described as follows:

abstract_port -module SyncCell -port IN -clock VCK -combo 0 abstract_port -module SyncCell -port OUT -clock Clk1 -sync -from VCK -to Clk1 where by default the synchronizer is active which means that this cell can be used to synchronize other crossings. It should be noted that VCK is an assumed virtual clock in the case were the source of a FF synchronizer is not shown. This clock will be properly mapped to the correct clock when module SyncCell is placed in a higher level context.

Figure 5:
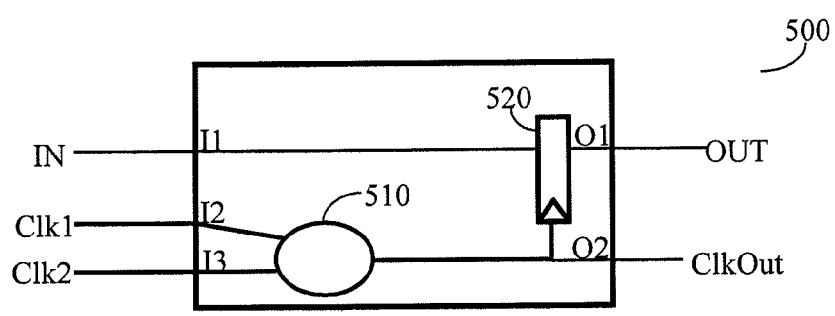
FIG. 5 is a block diagram of a module of a circuit having a virtual clock domain abstracted according to an exemplary implementation.

FIG. 5 depicts a block diagram 500 of a module of a circuit having a virtual clock domain abstracted according to the abstraction principles described above. Here, Clk1 and Clk2 are combined into a ClkOut signal that also drives the FF 520 of the circuit 500. Hence, a constraint may be generated for the clock stating:

clock -name o2 -clock vc1 where vc1 represents the virtual clock domain created from Clk1 and Clk2. This domain can in turn be reused to define the domain of the other ports of this block.

Figure 6:
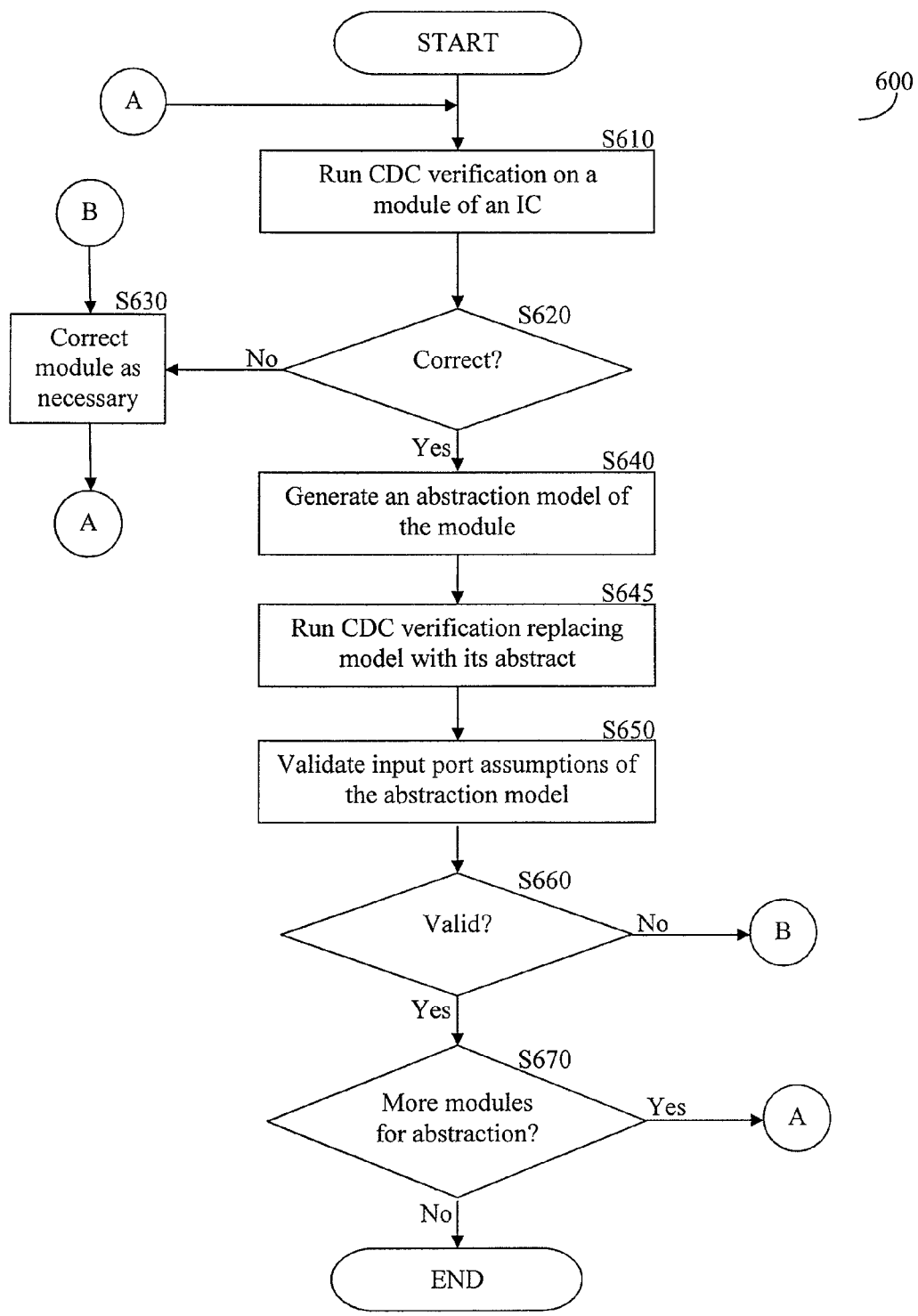
FIG. 6 is an exemplary flowchart of the creation of an abstraction of a module within an IC.

Reference is now made to FIG. 6 where an exemplary and non-limiting flowchart 600 describes the creation of an abstracted module within an IC. In S610 a module is selected for abstraction and CDC verification run thereon. In S620 it is checked if there are errors and if so execution continues with S630 for correction of the errors and return to S610; otherwise, execution continues with S640. In S640 an abstraction of the module constraints is generated on the ports of the module, as explained in more detail herein above. In S645 a CDC verification takes place where the abstracted model replaces the module. In S650 the assumptions on the inputs of the module are validated. It should be noted that this validation takes place when the module is used at a higher level. In S660, it is checked if validation was successful. If validation was not successful execution continues with S630 for correction of the assumptions and re-abstraction of the module by returning to S610; otherwise, execution continues with S670 where it is checked if more modules are to be abstracted and if so execution continues with S610; otherwise, execution terminates.

The principles of the invention are implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. In particular, such a computer platform may be a dedicated computer aided design (CAD) system equipped with the desired hardware and software components. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for clock-domain crossing (CDC) verification of a model of an integrated circuit (IC) comprising a plurality of modules, the method comprising:
    identifying a module from among the plurality of modules that has not been previously abstracted or that has not changed since a previous abstraction, the module having an input and an output;
    performing a CDC verification on the module in a bottom-up fashion by a computer processor device;
    replacing the module with a corresponding abstraction module that correctly identifies a corresponding clock-domain for each of the input and the output, the replacing performed in response to the module successfully passing the respective CDC verification;
    repeating the identifying, performing, and replacing for each of the remaining modules from among the plurality of modules; and
    storing an updated model of the IC comprising at least a replaced module in storage.

2. The method of claim 1, wherein the abstraction model includes an assumption for the input of the module and a constraint for an output port of the output of the module.

3. The method of claim 2, further comprising:
    verifying the assumption when validating a higher level module that includes the abstracted module.

4. The method of claim 2, wherein the constraint comprises at least one of: module name, port name, clock domain, name of at least one of synchronizers, flip-flops (FFs), and latches.

5. The method of claim 4, wherein the constraint is an indication that there is a synchronizer within the clock domain of the output port.

6. The method of claim 5, wherein the indication further comprises at least one of: a name of a clock that is a source of the synchronizer, a name of a clock that is a destination of the synchronizer, an indication of a delay in the synchronizer for metastability to settle, an indication whether the synchronizer drives the output port with or without latches of flip-flops (FFs) in a path to the output port, an indication whether the synchronizer is active and can synchronize a crossing, and an indication whether the synchronizer is inactive not being able to synchronize a clock-domain crossing.

7. The method of claim 4, wherein the constraint is an indication of an input port that has a structural path to the output port.

8. The method of claim 2, wherein the constraint comprises at least an indication of combinational logic within the module with respect to the output port.

9. The method of claim 8, wherein the indication is one of: combinational logic exists, combinational logic does not exist, combinational logic is irrelevant.

10. A computer program product containing a plurality of instructions embedded in a non-transitory computer readable medium that when executed by a computing device causes the computing device to execute a method for clock-domain crossing (CDC) verification of a model of an integrated circuit (IC) comprising a plurality of modules, the method comprising:

identifying a module from among the plurality of modules that has not been previously abstracted or that has not changed since a previous abstraction, the module having an input and an output;

performing a CDC verification on the module in a bottom-up fashion;

replacing the module with a corresponding abstraction module that correctly identifies a corresponding clock-domain for each of the input and the output, the replacing performed in response to the module successfully passing the respective CDC verification;

repeating the identifying, performing, and replacing for each of the remaining modules from among the plurality of modules; and storing an updated model of the IC comprising at least a replaced module in storage.

11. A system comprising a processing unit and a memory communicably coupled to the processing unit, the memory storing a design file for an integrated circuit and instructions for enabling the processing unit to perform a clock-domain crossing (CDC) verification of a model of an integrated circuit (IC) comprising a plurality of modules, wherein the processing unit:

identifies a module from among the plurality of modules that has not been previously abstracted or that has not changed since a previous abstraction, the module having an input and an output;

performs a CDC verification on the module in a bottom-up fashion;

replaces the module with a corresponding abstraction module that correctly identifies a corresponding clock-domain for each of the input and the output, the replacing performed in response to the module successfully passing the respective CDC verification;

repeats the identifying, performing, and replacing for each of the remaining modules from among the plurality of modules; and stores an updated model of the IC comprising at least a replaced module in the memory.

12. The system of claim 11, wherein the system is a computer aided design (CAD) system.

* * * * *